United States Patent
Yin et al.

(10) Patent No.: US 8,054,563 B2
(45) Date of Patent: Nov. 8, 2011

(54) WIDE ANGLE LENS SYSTEM

(75) Inventors: Chun-Yi Yin, Taipei Hsien (TW); Chun-Hsiang Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 24 days.

(21) Appl. No.: 12/643,976

(22) Filed: Dec. 21, 2009

(65) Prior Publication Data

US 2011/0051259 A1  Mar. 3, 2011

(30) Foreign Application Priority Data

Aug. 28, 2009 (CN) .......................... 2009 1 0306278

(51) Int. Cl.
*G02B 9/12* (2006.01)
(52) U.S. Cl. ................... 359/791; 359/708; 359/716
(58) Field of Classification Search .......... 359/713–716, 359/754, 755, 759, 760, 767–769, 771, 779, 359/791
See application file for complete search history.

(56) References Cited

U.S. PATENT DOCUMENTS

| 7,443,613 | B2 * | 10/2008 | Noda | 359/784 |
| 7,636,207 | B2 * | 12/2009 | Hsu | 359/791 |
| 2004/0240082 | A1 * | 12/2004 | Amanai | 359/754 |
| 2005/0117047 | A1 * | 6/2005 | Isono | 348/335 |
| 2008/0024880 | A1 * | 1/2008 | Tang | 359/716 |

FOREIGN PATENT DOCUMENTS

| CN | 1766691 A | 5/2006 |
| CN | 101369045 A | 2/2009 |
| JP | 2005164872 A | 6/2005 |

* cited by examiner

*Primary Examiner* — Darryl J Collins
(74) *Attorney, Agent, or Firm* — Altis Law Group, Inc.

(57) ABSTRACT

The present disclosure relates to a wide angle lens system. The wide angle lens system includes, in order from the object side to the image side thereof, a first lens of positive refraction power, a second lens of positive refraction power, and a third lens of negative refraction power. The wide angle lens system satisfies the following condition: $0.45<f/TTL<0.75$; and $1.4<f1/f<2.4$. Wherein, TTL is a distance from a surface of the first lens facing the object side of the wide angle lens system to an image plane, f is a focal length of the wide angle lens system, and f1 is a focal length of the first lens.

3 Claims, 7 Drawing Sheets

WIDE ANGLE LENS SYSTEM

BACKGROUND

1. Technical Field

The present disclosure relates to lens systems and, more particularly, to a wide angle lens system.

2. Description of Related Art

With the development of microcircuitry and multimedia technology, digital cameras are now in widespread use. Many mobile phones and PDAs (Personal Digital Assistant) are now equipped with a digital camera. Conventionally, a viewing angle of a digital camera is between 50 degrees and 60 degrees. Digital cameras with such a range if viewing angle have a small imaging area, thereby it can not satisfy some special purpose such as imaging a large area when, for example, users shot self-portraits.

What is needed, therefore, is a wide angle lens system with compact size to overcome or at least alleviate the above problem.

BRIEF DESCRIPTION OF THE DRAWING

Many aspects of the present wide angle lens system can be better understood with reference to the following drawings. The components in the drawings are not necessarily drawn to scale, the emphasis instead being placed upon clearly illustrating the principles of the present wide angle lens system.

DETAILED DESCRIPTION

Embodiments of the present disclosure will now be described in detail below, with reference to the accompanying drawings.

Figure 1:
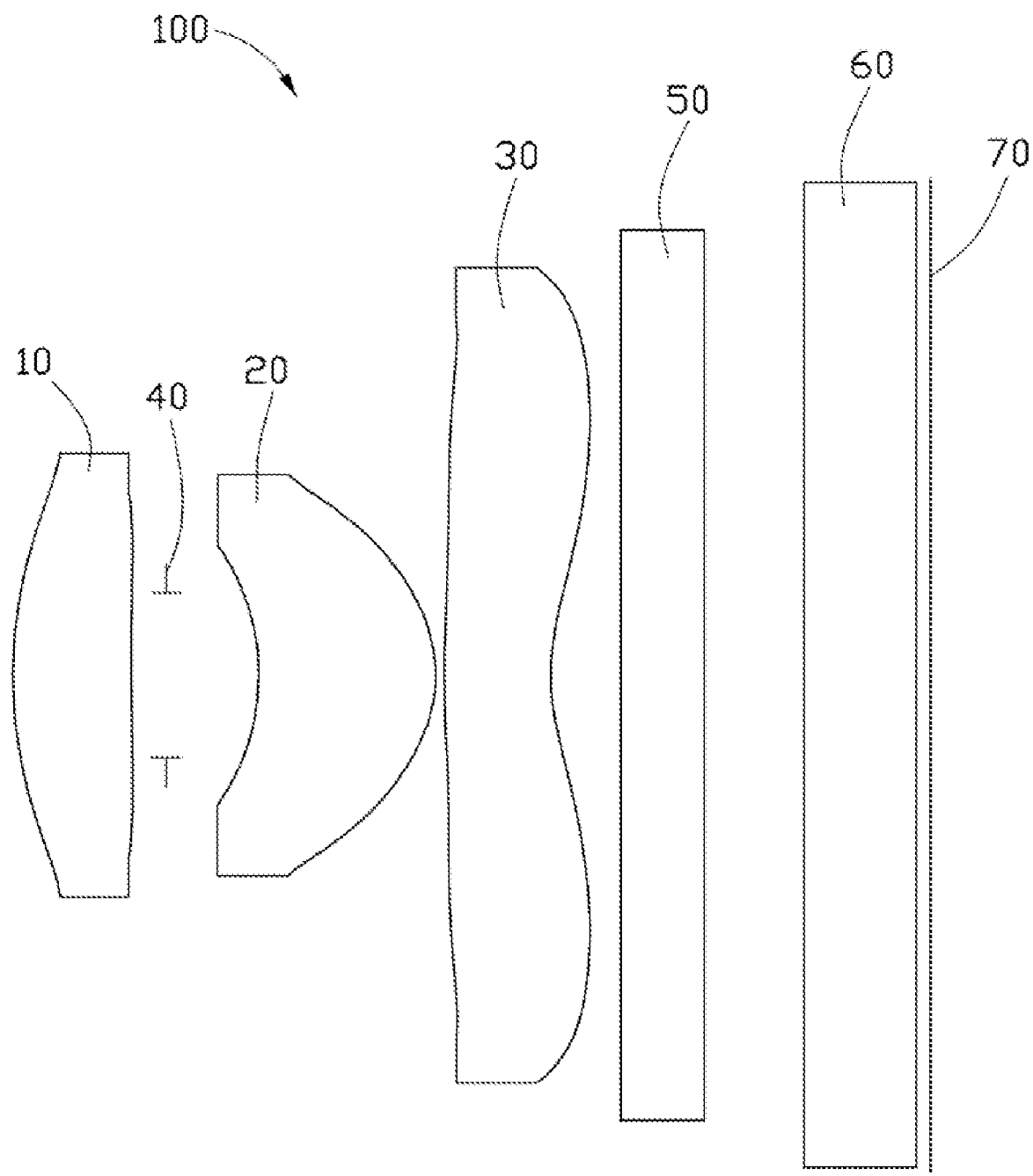
FIG. 1 is a schematic view of a wide angle lens system according to an exemplary embodiment.

Referring to FIG. 1, a wide angle lens system 100 according to an exemplary embodiment is shown. The wide angle lens system 100 includes, in order from the object side to the image side of the wide angle lens system 100, a first lens 10, a second lens 20, and a third lens 30. The first lens 10 is a positive refraction power lens. The second lens 20 is a positive refraction power lens. The third lens 30 is a negative refraction power lens. The wide angle lens system 100 can be used in digital cameras, mobile phones, personal computer cameras and so on. In the embodiment, the wide angle lens system 100 is used in mobile phones. The wide angle lens system 100 further includes an image plane 70, an infrared filter 50, and a glass sheet 60 installed between the third lens 30 and the image plane 70 for filtering infrared light in the wide angle lens system 100 and protecting the surface of the image plane 70.

When capturing an image, incident light enters the wide angle lens system 100, through three lenses 10~30, and focused onto the image plane 70 to form an image.

In order for the wide angle lens system 100 to have a short overall length and a wider field angle, the wide angle lens system 100 satisfies the following conditions:

$$0.45 < f/TTL < 0.75; \text{ and} \quad (1)$$

$$1.4 < f1/f < 2.4, \quad (2)$$

wherein, TTL is a distance from an outside surface of the first lens 10 to the image plane 70, f is a focal length of the wide angle lens system 100, and f1 is a focal length of the first lens 10. The first condition (1) is for limiting the overall length of the wide angle lens system 100 by providing the relationship between the overall length of the wide angle lens system 100 and the focal length of the wide angle lens system 100. The second condition (2) is for increasing the field angle of the wide angle lens system 100 to 70° by limiting the relationship between the focal length of the first lens 10 and the focal length of the wide angle lens system 100. In the present embodiment, the two surfaces of the first lens 10 are aspherical.

Preferably, the wide angle lens system 100 further satisfies the following condition:

$$0.5 < f2/f < 0.9, \quad (3)$$

Wherein, f2 is a focal length of the second lens 20. The third condition (3) is for correcting aberrations of the astigmatism and the distortion of the wide angle lens system 100 by limiting the relationship between the focal length of the second lens 20 and the focal length of the wide angle lens system 100. In the present embodiment, the two surfaces of the second lens 20 are aspherical.

Preferably, the wide angle lens system 100 further satisfies the following condition:

$$45 < vd2 < 60, \quad (4)$$

Wherein, vd2 is an Abbe constant of the second lens 20. The fourth condition (4) is for ensuring the second lens 20 removes the chromatic difference of magnification of wide angle lens system 100, when the light transmitting through the second lens 20.

Preferably, the wide angle lens system 100 further satisfies the following condition:

$$-1.4 < f3/f < -0.7, \quad (5)$$

Wherein, f3 is a focal length of the third lens 30. The fifth condition (5) is for decreasing astigmatism, spherical aberration and coma of the wide angle lens system 100 by limiting the relationship between the focal length of the third lens 30 and the focal length of the wide angle lens system 100. In the present embodiment, the two surfaces of the third lens 30 are aspherical.

The wide angle lens system 100 further includes an aperture stop 40 installed between the first lens 10 and the second lens 20. The aperture stop 40 is configured for adjusting light flux from the first lens 10 to the second lens 20. In addition, the aperture stop 40 facilitates uniform light transmission when light passes trough the first lens 10 to correct coma aberrations of the wide angle lens system 100. To minimize the manufacture cost and the overall length of the wide angle lens system 100, the aperture stop 60 can be obtained by smearing an opaque material on an outer rim of the surface of the first lens 10 facing the image side of the wide angle lens system 100.

Furthermore, the first lens 10, the second lens 20, and the third lens 30 can be made from a material manufactured relatively easy and inexpensive, such as resin or a plastic. In the present embodiment, the first lens 10, the second lens 20, and the third lens 30 are made of plastic.

Example diagrams of the wide angle lens system 100 will be described below with reference to FIGS. 2-7. It is to be understood that the disclosure is not limited to these examples. The following are symbols used in each exemplary embodiment.

$F_{No}$: F number;
2ω: field angle;
R: radius of curvature;
d: distance between surfaces on the optical axis of the wide angle lens system 100;
Nd: refractive index of lens; and
V: Abbe constant.

In each example, both surfaces of the first lens 10, both surfaces of the second lens 20, and both surfaces of the third lens 30 are aspheric. The shape of each aspheric surface is determined by expression 1 below. Expression 1 is based on a Cartesian coordinate system, with the vertex of the surface being the origin, and the optical axis extending from the vertex being the x-axis.

$$x = \frac{ch^2}{1 + \sqrt{1 - (k+1)c^2h^2}} + \sum A_i h^i \qquad \text{Expression 1}$$

wherein, h is a height from the optical axis to the surface, c is a vertex curvature, k is a conic constant, and Ai are i-th order correction coefficients of the aspheric surfaces.

EXAMPLE

Embodiment 1: tables 1, 2 show specifications of a first embodiment of the wide angle lens system 100, wherein $F_{No}$=2.8, 2ω=85°.

TABLE 1

| Wide angle lens system 100 | R (mm) | d (mm) | nd | V |
|---|---|---|---|---|
| Object side surface of the first lens 10 | 1.610171 | 0.422191 | 1.54347 | 56.8 |
| Image side surface of the first lens 10 | 11.83919 | 0.152128 | — | — |
| aperture stop 40 | infinite | 0.300789 | | |
| Object side surface of the second lens 20 | −1.06754 | 0.636538 | 1.54347 | 56.8 |
| Image side surface of the second lens 20 | −0.51699 | 0.03 | — | — |
| Object side surface of the third lens 30 | 2.056871 | 0.381597 | 1.54347 | 56.8 |
| Image side surface of the third lens 30 | 0.712006 | 0.25 | — | — |
| Object side surface of the infrared filter 50 | infinite | 0.3 | 1.523100 | 55 |
| Image side surface of the infrared filter 50 | infinite | 0.357635 | — | — |
| Object side surface of the glass sheet 60 | infinite | 0.4 | 1.525500 | 62.2 |
| Image side surface of the glass sheet 60 | infinite | 0.05 | — | — |

TABLE 2

| Surface | Aspherical coefficient |
|---|---|
| Object side surface of the first lens 10 | K = −1.29709; A4 = 0.022922; A6 = 0.049777; A8 = −0.22263; A10 = −0.10447; A12 = −0.00482; |
| Image side surface of the first lens 10 | K = 256.5787; A4 = −0.02371; A6 = −0.51251; A8 = 0.381051; A10 = 0.472822; A12 = −1.16862; |
| Object side surface of the second lens 20 | K = 0.522839; A4 = −0.34286; A6 = −5.85116; A8 = 41.43286; A10 = −183.474; A12 = 386.7807; |
| Image side surface of the second lens 20 | K = −1.05627; A4 = 0.231105; A6 = −2.20544; A8 = 8.486722; A10 = −23.8388; A12 = 25.02214; |
| Object side surface of the third lens 30 | K = −300; A4 = −0.15357; A6 = 0.225659; A8 = −0.09994; A10 = 0.004555; A12 = 0.003266; |
| Image side surface of the third lens 30 | K = −10.8807; A4 = −0.19811; A6 = 0.114332; A8 = −0.03918; A10 = 0.008945; A12 = −0.00249; |

Figure 2:
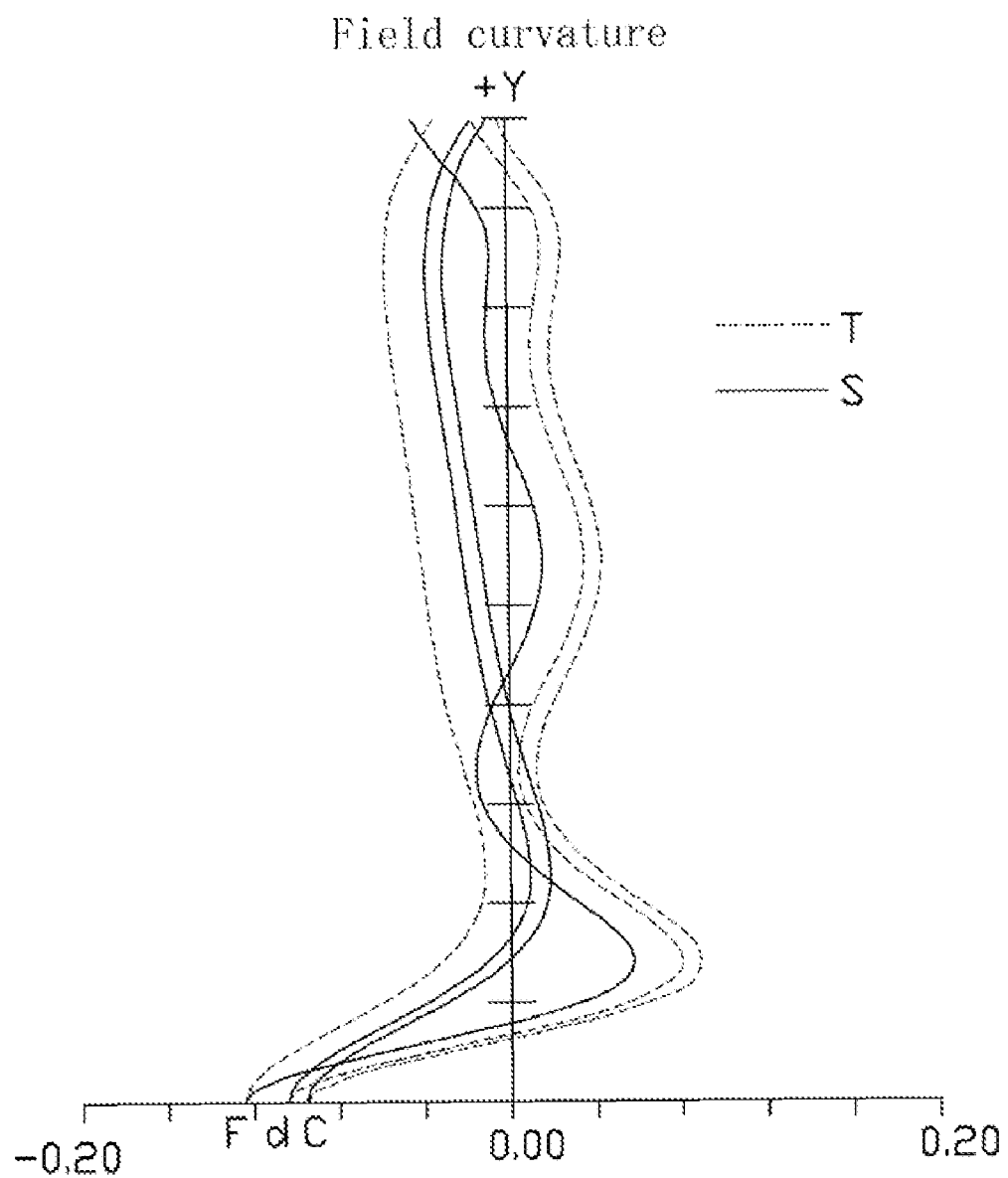
FIG. 2 is a field curvature diagram of the wide angle lens system of a first exemplary embodiment.
Figure 3:
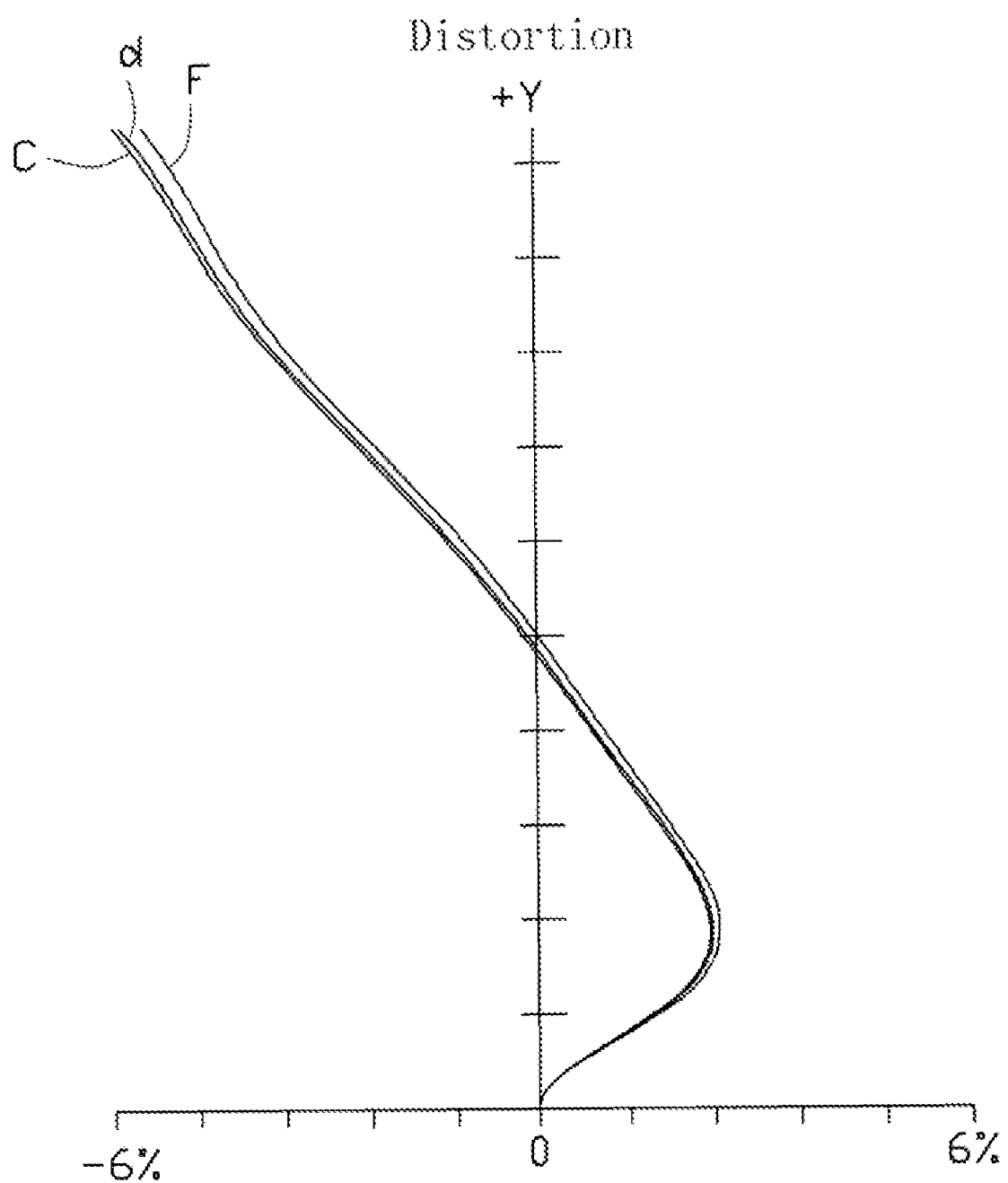
FIG. 3 is a distortion diagram of the wide angle lens system of the first exemplary embodiment.
Figure 4:
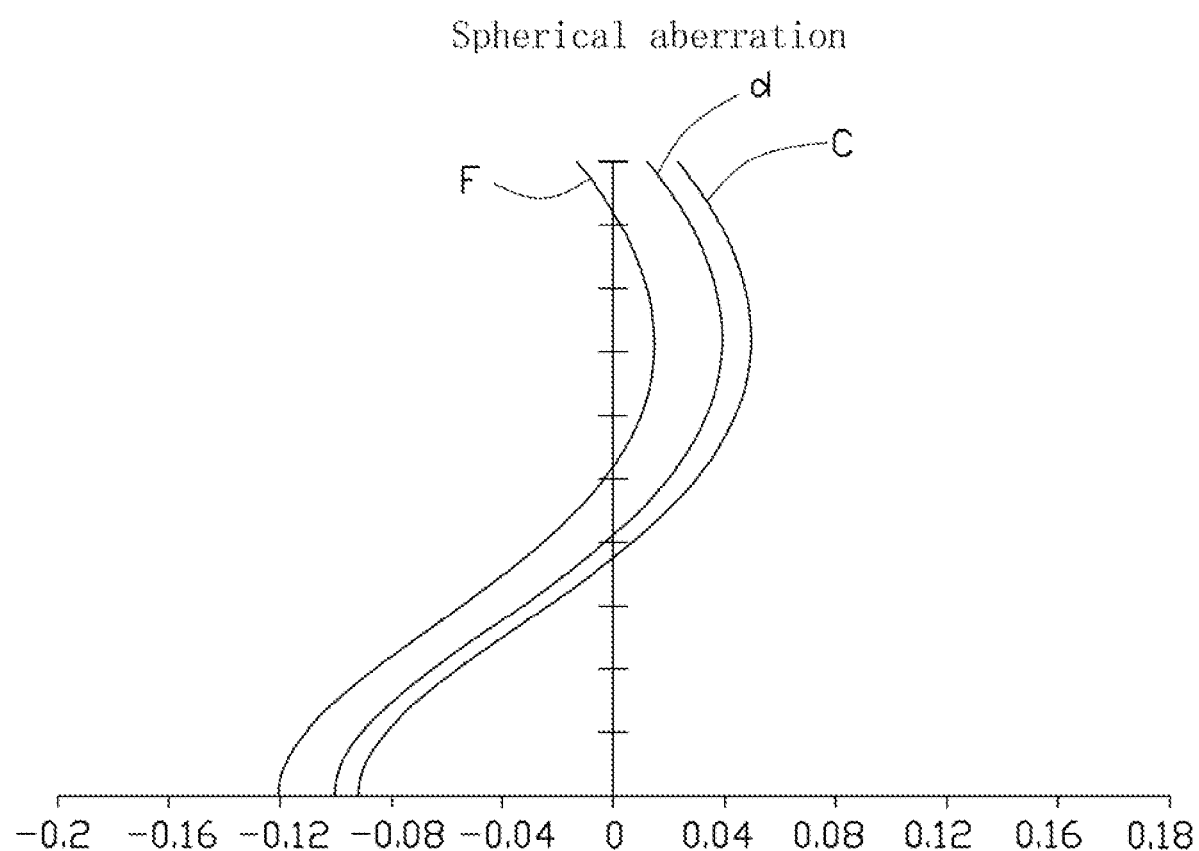
FIG. 4 is a spherical aberration diagram of the wide angle lens system of the first exemplary embodiment.

FIGS. 2-4 are graphs of aberrations (field curvature, distortion, and spherical aberration) of the wide angle lens system 100 of Example 1. In FIGS. 2-4, the curves C, d, and F show spherical aberrations of the wide angle lens system 100 corresponding to three light wavelengths of 486 nm, 587 nm, and 656 nm respectively. Generally, the field curvature of the wide angle lens system 100 is limited to a range from −0.2 mm to 0.2 mm, the distortion of the wide angle lens system 100 is limited to a range from −6% to 6%, and the spherical aberration of wide angle lens system 100 is limited to a range from −0.2 mm to 0.2 mm.

In Example 1, though the overall length of the wide angle lens system 100 is reduced, aberrations of the wide angle lens system 100 are maintained within an acceptable range. The wide angle lens system 100 keeps chromatic aberrations at a minimum while reducing the overall length of the wide angle lens system 100.

Embodiment 2: tables 3, 4 show specifications of a second embodiment of the wide angle lens system 100, wherein $F_{No}$=2.8, 2ω=85°.

TABLE 3

| Wide angle lens system 100 | R (mm) | d (mm) | nd | V |
|---|---|---|---|---|
| Object side surface of the first lens 10 | 1.352895 | 0.336885 | 1.54347 | 56.8 |
| Image side surface of the first lens 10 | 6.22865 | 0.082066 | — | — |
| aperture stop 40 | infinite | 0.382172 | | |
| Object side surface of the second lens 20 | −0.93771 | 0.571676 | 1.54347 | 56.8 |
| Image side surface of the second lens 20 | −0.44144 | 0.030001 | — | — |
| Object side surface of the third lens 30 | 2.034236 | 0.300229 | 1.54347 | 56.8 |
| Image side surface of the third lens 30 | 0.575089 | 0.25 | | |
| Object side surface of the infrared filter 50 | infinite | 0.3 | 1.523100 | 55 |
| Image side surface of the infrared filter 50 | infinite | 0.38007 | — | — |
| Object side surface of the glass sheet 60 | infinite | 0.4 | 1.525500 | 62.2 |
| Image side surface of the glass sheet 60 | infinite | 0.05 | — | — |

TABLE 4

| Surface | Aspherical coefficient |
|---|---|
| Object side surface of the first lens 10 | K = −0.74104; A4 = 0.024678; A6 = −0.31194; A8 = 0.719741; A10 = −1.28826; A12 = −0.86486; |
| Image side surface of the first lens 10 | K = 162.8932; A4 = −0.32364; A6 = 1.143043; A8 = −11.5882; A10 = 43.16819; A12 = −93.9107; |
| Object side surface of the second lens 20 | K = 0.377414; A4 = −0.32936; A6 = −9.45768; A8 = 66.13261; A10 = −245.83; A12 = 343.5287; |
| Image side surface of the second lens 20 | K = −1.68345; A4 = −0.00521; A6 = −3.35505; A8 = 10.17852; A10 = −21.8762; A12 = 21.66785; |
| Object side surface of the third lens 30 | K = −499.725; A4 = −0.09524; A6 = 0.20269; A8 = −0.12529; A10 = 0.030336; A12 = −0.00351; |
| Image side surface of the third lens 30 | K = −9.71648; A4 = −0.19709; A6 = 0.135147; A8 = −0.0656; A10 = 0.024028; A12 = −0.00575; |

Figure 5:
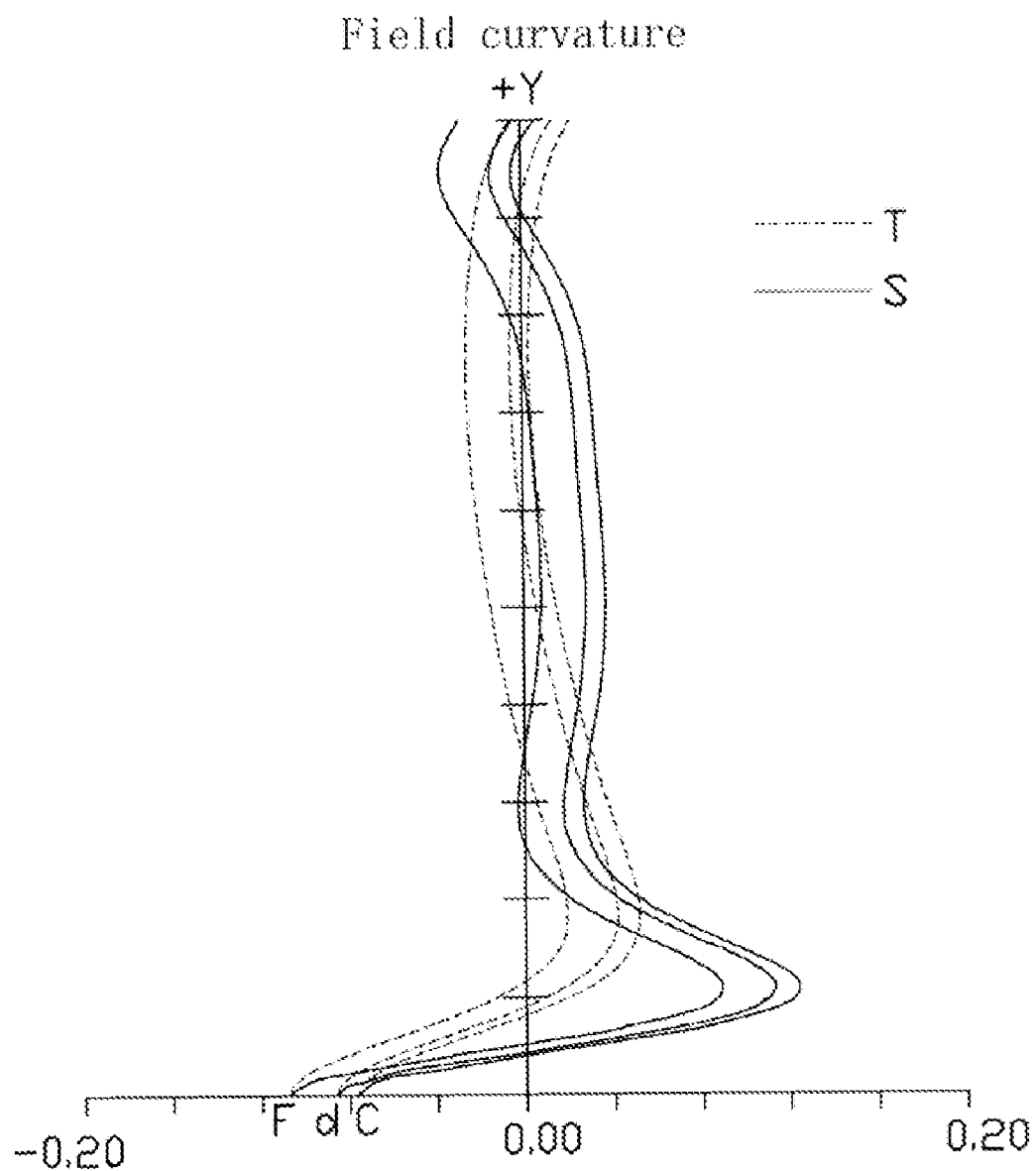
FIG. 5 is a field curvature diagram of the wide angle lens system of a second exemplary embodiment.
Figure 6:
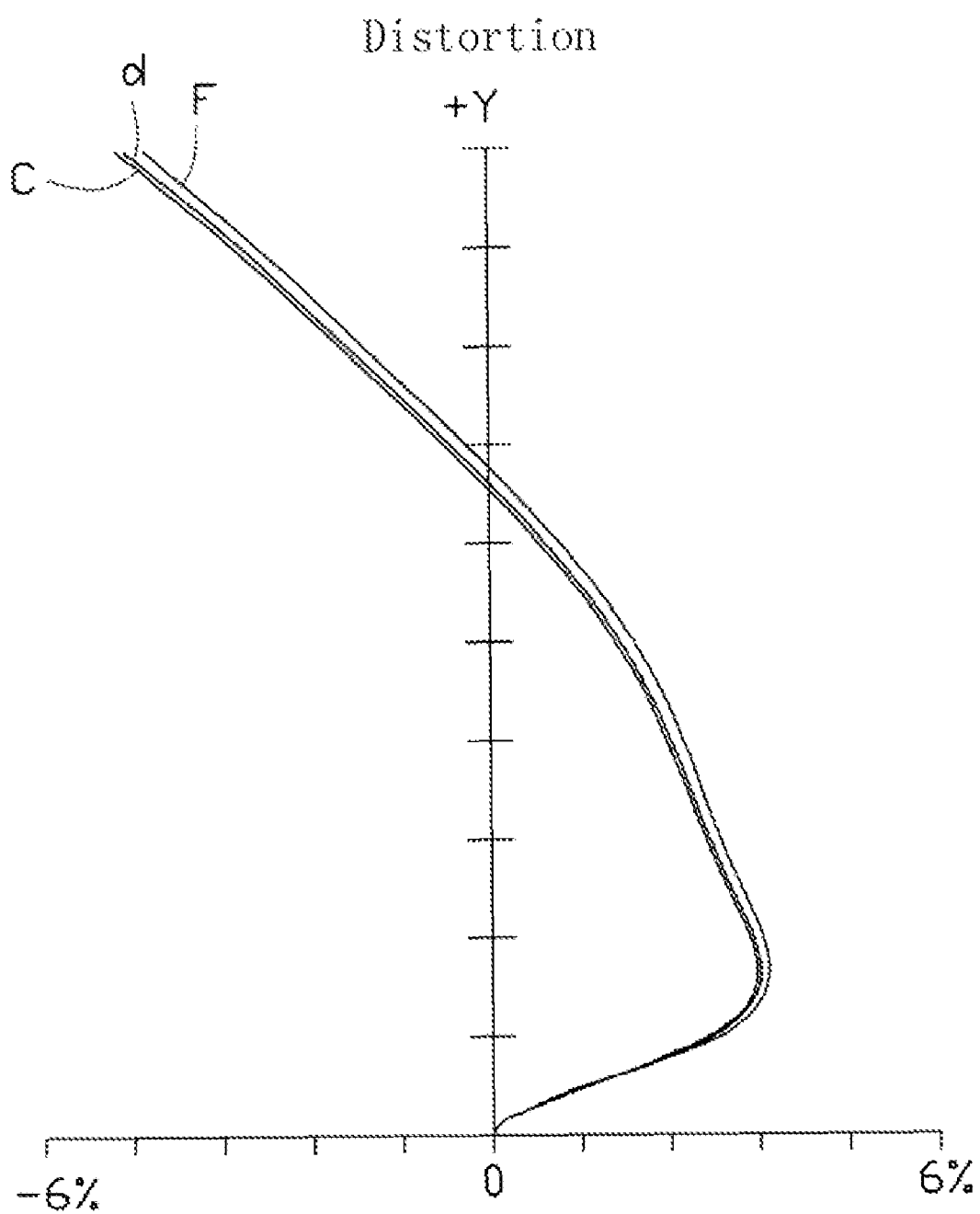
FIG. 6 is a distortion diagram of the wide angle lens system of the second exemplary embodiment.
Figure 7:
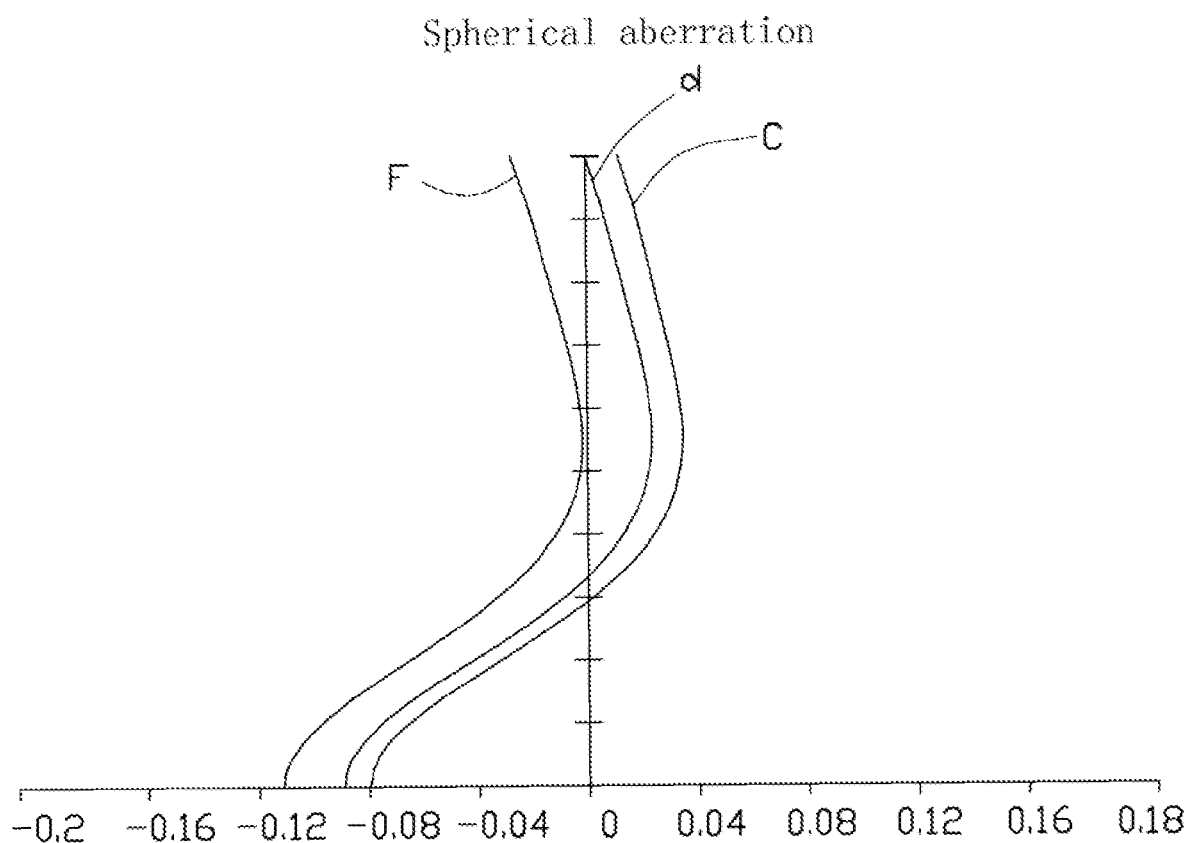
FIG. 7 is a spherical aberration diagram of the wide angle lens system of the second exemplary embodiment.

FIGS. 5-7 are graphs of aberrations (field curvature, distortion, and spherical aberration) of the wide angle lens system 100 of Example 2. In FIGS. 5-7, the curves C, d, and F show spherical aberrations of the wide angle lens system 100 corresponding to three light wavelengths of 486 nm, 587 nm, and 656 nm respectively. Generally, the field curvature of the wide angle lens system 100 is limited to a range from −0.2 mm to 0.2 mm, the distortion of the wide angle lens system 100 is limited to a range from −6% to 6%, and the spherical aberration of wide angle lens system 100 is limited to a range from −0.2 mm to 0.2 mm.

In example 2, although the overall length of the wide angle lens system 100 is reduced, aberrations of the wide angle lens system 100 are maintained within an acceptable range. The wide angle lens system 100 can widen the field angle of the wide-angle lens 100 while reducing the overall length of the wide angle lens system 100.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A wide angle lens system comprising, in order from the object side to the image side thereof, a first lens with positive refraction power, a second lens with positive refraction power, and a third lens with negative refraction power, the wide angle lens system satisfying the following conditions:

$$0.45 < f/TTL < 0.59 \quad (1)$$

$$1.4 < f1/f < 2.4 \quad (2)$$

$$0.5 < f2/f < 0.9 \quad (3)$$

wherein, TTL is a distance from a surface of the first lens facing the object side of the wide angle lens system to an image plane, f is a focal length of the wide angle lens system, f1 is a focal length of the first lens, and f2 is a focal length of the second lens.

2. A wide angle lens system comprising, in order from the object side to the image side thereof, a first lens with positive refraction power, a second lens with positive refraction power, and a third lens with negative refraction power, the wide angle lens system satisfying the following conditions:

$$0.45 < f/TTL < 0.59 \quad (1)$$

$$1.4 < f1/f < 2.4 \quad (2)$$

$$-1.4 < f3/f < -0.7, \quad (3)$$

wherein, TTL is a distance from a surface of the first lens facing the object side of the wide angle lens system to an image plane, f is a focal length of the wide angle lens system, f1 is a focal length of the first lens, and f3 is a focal length of the third lens.

3. The wide angle lens system of claim 2, wherein each of the first lens, the second lens, and the third lens is an aspherical lens.

* * * * *